United States Patent [19]

Schrag et al.

[11] Patent Number: 4,829,756
[45] Date of Patent: May 16, 1989

[54] SQUARE BALER HAVING PLUNGER CLEANOUT MEANS

[75] Inventors: Thomas G. Schrag; Craig Pecenka, both of Hesston, Kans.

[73] Assignee: Hesston Corporation, Hesston, Kans.

[21] Appl. No.: 103,053

[22] Filed: Sep. 30, 1987

[51] Int. Cl.[4] ............................................. A01D 39/00
[52] U.S. Cl. ....................................... 56/341; 100/179
[58] Field of Search ............................... 56/341, 343; 100/199-192

[56] References Cited

U.S. PATENT DOCUMENTS

| | | | |
|---|---|---|---|
| 4,372,104 | 2/1983 | Simouis et al. | 56/341 |
| 4,525,991 | 7/1985 | Naaktgeboreu | 56/341 |
| 4,604,858 | 8/1986 | Esau et al. | 56/341 |

Primary Examiner—John Weiss
Attorney, Agent, or Firm—Hovey, Williams, Timmons & Collins

[57] ABSTRACT

A reciprocating plunger of a square baler has a series of cleanout probes fixed to an oscillating drive arm which reciprocates the plunger. The probes sweep along a path adjacent portions of a horizontal frame member of the plunger as the plunger moves through its operating cycle in order to remove the accumulation of loose crop materials from the same. The probes are arranged to swing away from the path of travel of needles which carry baling twine or wire upwardly through the plunger and toward an overlying knotting device, to thereby avoid interference with the needles and substantially prevent the needles from carrying any loose crop materials toward the knotting mechanism.

6 Claims, 2 Drawing Sheets

SQUARE BALER HAVING PLUNGER CLEANOUT MEANS

BACKGROUND OF THE INVENTION

1. Field of the Invention

This invention is broadly directed toward a square baler having a reciprocating plunger with spaced apart crop compacting and bale forming elements, and particularly concerns a series of shiftable cleanout probes which are movable through interior regions of the plunger for removal of loose crop materials which might otherwise be carried upwardly by knotting needles and become entangled in an overhead knotting device.

2. Description of the Prior Art

Balers for producing square bales of hay typically have an elongated chamber and a plunger shiftably mounted within the chamber for compaction of crop materials and formation of a bale. The plunger of such balers moves through an operating cycle which comprises a retraction stroke away from a partially formed bale in the chamber for enabling the admission of additional crop materials into the chamber between the plunger and the partially formed bale, followed by a compaction stroke to compress the newly admitted materials into compacted relation with the rest of the bale. Once a sufficient amount of crop materials have been introduced into the chamber and the bale is fully formed, a plurality of needles carry strands of baling twine, wire or the like around the end of the bale adjacent the plunger and then a knotting mechanism ties ends of the strands together to thereafter retain the bale in its compacted, formed configuration.

Typically, plungers of square balers are comprised of a series of elements each presenting a crop engaging and compacting face, and the elements are mounted on a frame member that extends transversely across the baling chamber for coupling each of the elements to a reciprocating drive mechanism. The elements are spaced apart from each other along the length of the frame member in order to provide clearance openings between each adjacent pair of elements, so that the needles carrying the baling twine or wire can pass through the space between the elements and allow the twine to be tied around the bale while the plunger is extended to maintain the bale in its compacted condition.

In smaller square balers, the crop engaging face of the plunger is often constructed to present two slots of relatively narrow width for enabling the needles to pass through the plunger and up toward the knotting device. In some cases, the slots of smaller balers become clogged with crop material and impede the needles as they move through the slots, occasionally breaking the needles or bending the needles away from the knotter. To overcome this problem, a pair of stationary cleanout probes of the type described in U.S. Pat. No. 4,604,858 and assigned to the assignee of the present invention may be fixed to walls defining the bale chamber for telescopic reception within the slots of the plunger during each retraction stroke thereof, to prod and poke loose materials from the plunger that might otherwise collect within the slots.

In larger square balers, and particularly those capable of producing bales having a weight of about one ton, the width of openings between adjacent elements of the plunger is somewhat larger than the width of the clearance slots in smaller balers, and consequently the crop materials do not normally become tightly compacted between the elements of the plunger of larger balers to such a degree that would cause the twine carrying needles to deflect or break. However, loose crop materials sometimes collect on top of the horizontal plunger frame members supporting the elements and as a result the needles when passing through the spaces between the elements may catch a portion of the crop materials and carry the same up to the knotting device. Thereafter, the knotting device may become so entangled with the crop materials that satisfactory operation of the knotter and binding of the bale is precluded.

SUMMARY OF THE INVENTION

The present invention concerns a shiftable means for cleaning loose crop materials from areas above a frame member of a square baler plunger so that the loose materials do not become caught by tips of the knotting needles. During each retraction stroke of the plunger, a series of cleanout probes, each corresponding to a space between adjacent elements, moves above portions of the horizontal frame member to sweep any loose crop materials away from the same. The probes shift away from path of travel of the needles during the compaction stroke of the plunger in order to avoid interference with the upwardly swinging needles passing baling twine to the overhead knotter.

To this end, the present invention contemplates the provision of a series of spaced cleanout probes mounted in spaced relation along the length of a horizontal beam which, in turn, is fixed to an oscillating arm of a drive mechanism coupling a powered drive crank to the plunger. The probes swing through a limited arc during oscillation of the arm and reciprocation of the plunger and are disposed to sweep crop materials away from top portions of the horizontal frame member between the adjacent crop compacting elements as the plunger travels through its cycle of operation.

In particularly preferred forms of the invention, each of the probes extends in generally parallel and offset relation to the longitudinal axis of the pivotal drive arm. The probes are positioned to sweep across top portions of the frame member in one direction during each retraction stroke of the plunger, and also shift in an opposite direction during each compression stroke of the plunger. The cleanout probes are connected to the drive arm at a location adjacent the plunger and consequently may be of relatively small size notwithstanding the fact that the baler including the baling chamber and the plunger are of substantial dimensions.

DETAILED DESCRIPTION OF THE DRAWINGS

Figure 1:
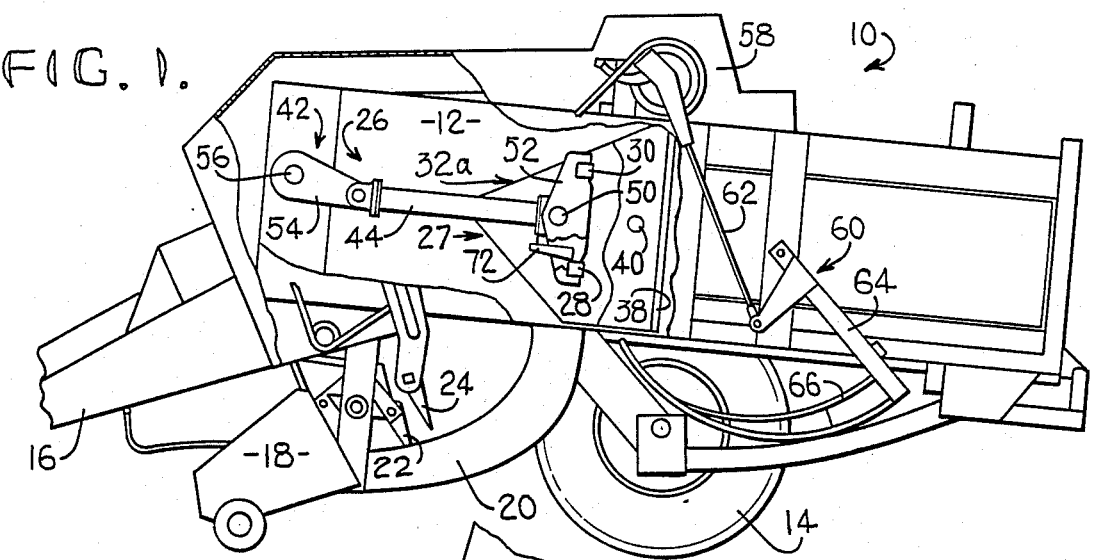
FIG. 1 is a fragmentary, side cross-sectional view of a baler constructed in accordance with the principles of the present invention.
Figure 2:
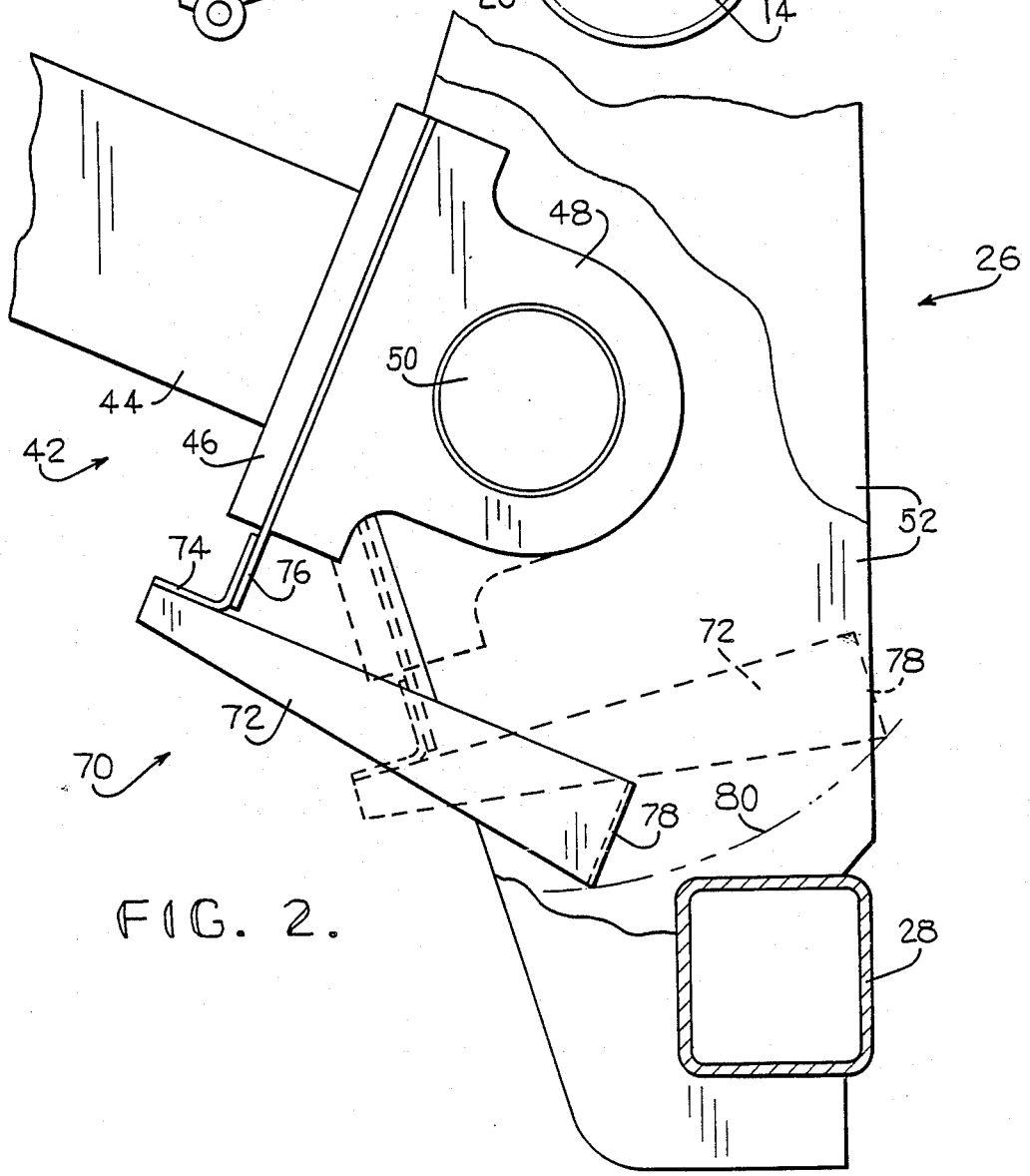
FIG. 2 is a fragmentary, enlarged, side cross-sectional view of a plunger, drive arm and cleanout probe of the baler shown in FIG. 1 with the arm and cleanout probe pivoted somewhat in contrast to the corresponding orientations shown in FIG. 1.
Figure 3:
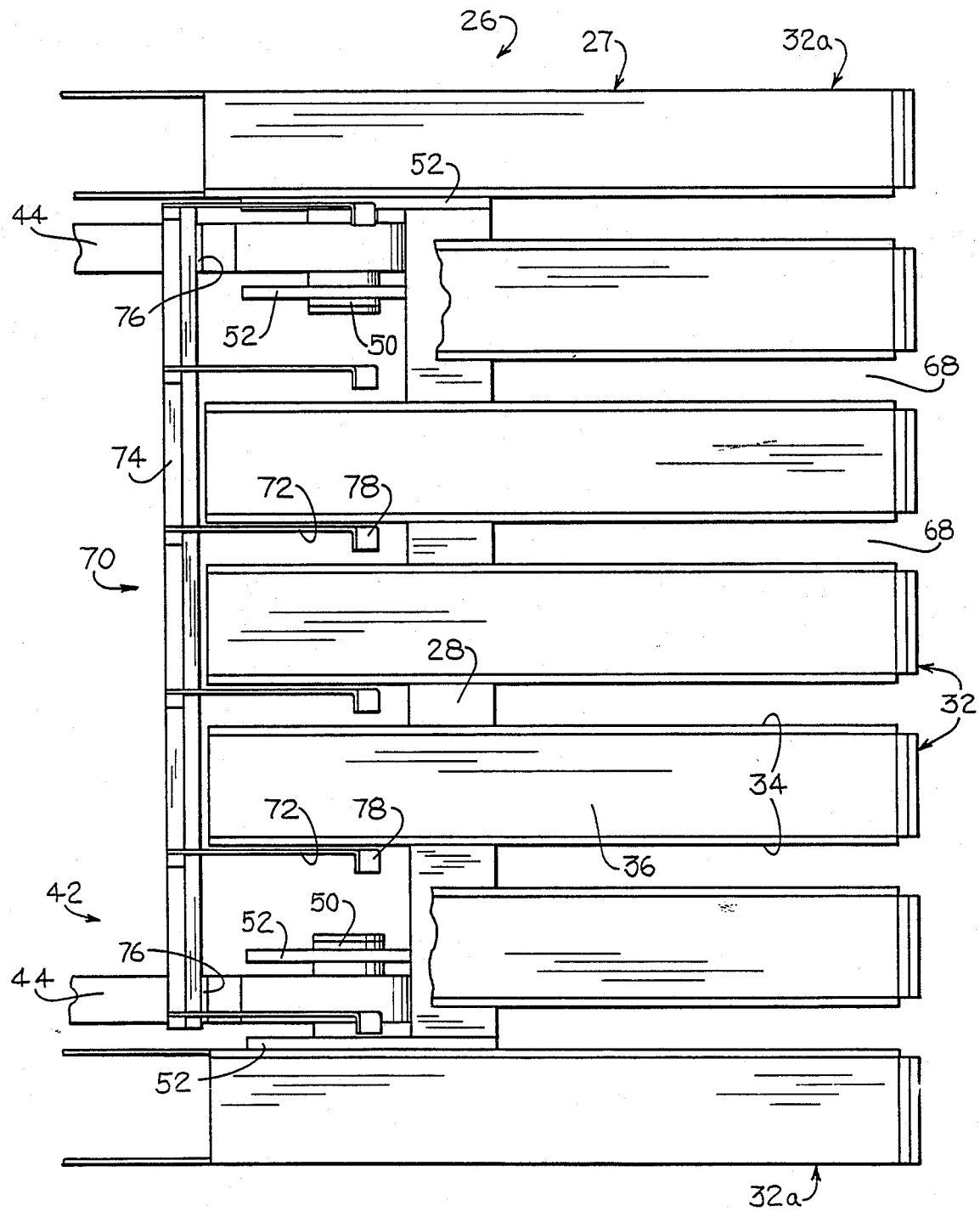
FIG. 3 is an enlarged, fragmentary, bottom view of the plunger and cleanout means shown in FIGS. 1 and 2.

A baler, broadly designated by the numeral 10 in FIGS. 1-3, has walls defining an elongated baling chamber 12 which extends along the fore and aft axis of baler 10 and which is rectangular in transverse cross-section. The baler 10 is mounted on a pair of wheels 14 (only one of which is shown in FIG. 1) and is connected by means of a tongue 16 to a towing vehicle for advancement of the baler 10 in a direction generally parallel to the longitudinal axis of chamber 12.

The baler 10 also includes a wheeled pick-up unit 18 that delivers crop material to the mouth of a charge chamber 20. A plurality of packing fingers 22 stuff the crop materials into the charge chamber 20 against the pressure of a number of releasable dogs (not shown) and the bottom of a plunger until such time as the charge chamber 20 is packed full of crop materials. Subsequently, the dogs retract and a plurality of stuffing fingers 24 descend into the charge chamber 20 and sweep the packed crop materials upwardly and into the baling chamber 12.

A plunger mechanism 26 is mounted within the baling chamber 12 for reciprocating movement in order to receive a charge of materials from the charge chamber 20 and compress the same against previously admitted materials in order to form a compacted bale. The plunger mechanism 26 includes a plunger head 27 (FIGS. 1-3) having a pair of horizontally extending, vertically spaced frame members 28, 30 that are generally square in transverse cross-section. Seven upright, crop engaging elements 32 (see FIG. 3) are connected to frame members 28, 30 along the lengths of the latter in spaced relationship to each other.

Referring to FIGS. 2 and 3, each of the elements 32 is of a generally trapezoidal configuration and includes a pair of upright, spaced, parallel side panels 34 that are interconnected by a bottom panel 36 (FIG. 3) and a crop engaging front panel or face 38 (FIG. 1). Each of the frame members 28, 30 is rigidly affixed to the side panels 34 of each element 32, and the side panels 34 are provided with apertures that are complemental to the transverse shape of the frame members 28, 30 for reception of the same.

The two outermost elements 32a disposed on each side of the plunger head 27 are somewhat longer than the remaining five elements 32 and extend in a direction toward the front of the baler 10 as shown in FIGS. 1 and 3. The two outermost elements 32a each carry two horizontally spaced rollers 40, one of which is located near the face 38 of the plunger head 27 in FIG. 1 and the other of which, although not shown, is located near the forwardmost, converging portion of the elements 32a. The rollers 40 ride in tracks connected to the sidewalls defining the baling chamber 12, and support the plunger head 27 for shifting movement in a direction generally parallel to the longitudinal, or fore-and-aft axis of baling chamber 12.

The plunger mechanism 26 also includes a drive means 42 for shifting the elements 32 of plunger head 27 through an operating cycle comprising an alternating series of crop compaction strokes followed by retraction strokes. The drive mechanism 42 comprises a pair of drive arms 44 each having a rear portion 46 (FIG. 2) connected by bolts to a respective collar 48 which is, in turn, swingably connected by a pivot 50 to two upright brackets 52 which are also shown in FIGS. 1 and 3. Viewing FIG. 1, the bracket 52 is fixed to both of the horizontal frame members 28, 30 for drivingly coupling the arm 44 to the plunger head 27.

A forward portion of the drive arm 44, as shown in FIG. 1, is pivotally connected to one end of a drive crank 54 that is fixed to and rotates simultaneously with a horizontally extending drive shaft 56. Thus, rotation of the shaft 56 and crank 54 swings drive arm 44 through an oscillating path of travel to thereby shift plunger head 27 through its operating cycle while the latter is supported for linear, reciprocating motion by rollers 40 above the bottom of the baling chamber 12.

Referring again to FIG. 1, a knotting device 58 is located generally above the plunger head 27 and operates in conjunction with an apparatus 60 for carrying strands of baling line such as twine or wire to the knotting device 58. Apparatus 60 includes link 62 pivotally connected to lever 64 which in turn carries a curved needle 66 having an uppermost tip that periodically transports ends of strands of the baling line up to the knotting device 58 to enable the latter to tie the strands around a compacted, formed bale.

As illustrated in FIG. 3, six upright slots or openings 68 are presented between adjacent pairs of the seven spaced plunger elements 32. Although not shown in FIG. 3, the apparatus 60 of FIG. 1 includes six substantially identical needles 66 that are constructed and arranged to pass through the opening 68 along an arcuate path of travel as provided by lever 64 when the bale is fully formed and the plunger head 27 is extended near the end of its compaction stroke as depicted in FIG. 1. The tips of the needles 66 each pass closely adjacent respective portions of the lower frame member 28 and hence, before discovery of the present invention would tend to pick up loose crop materials lying atop the upper surface of frame member 28 and carry the materials toward the knotting device 58.

In accordance with the invention, probe means 70 is provided for clearing crop materials from the top of plunger frame member 28 and away from areas adjacent the paths of needles 66. Probe means 70 includes six elongated probes 72 as shown in FIG. 3 that are connected at spaced intervals to an elongated beam 74 having an L-shaped configuration in transverse section. Comparing FIGS. 2 and 3, opposite end portions of the beam 74 are secured to plates 76 that are fixedly clamped between rear portions 46 of respective drive arms 44 and the corresponding, adjacent flat face of collar 48.

Each of the probes 72 presents a turned end segment 78 disposed in a plane transverse to the longitudinal axis of the major extent of the respective probes 72. As can be best appreciated by a reference to FIG. 2, swinging motion of the drive arm 44 about pivot 50 causes probes 72 to simultaneously swing in an arc and sweep away any loose crop materials, including fines, stems and other debris that may have accumulated on top of adjacent upper portions of the frame member 28. The transverse end segments 78 tend to push loose materials toward the crop engaging face of plunger head 27 during certain portions of the operating cycle of the latter, and also tend to scoop any loose crop materials in an opposite direction during other portions of the operating cycle of plunger head 27.

In FIG. 2, the limits of travel of one of the probes 72 are represented by the full line and dashed line depictions. The full line drawing in FIG. 2 shows the position of the drive arm 44 and probe 72 when the outer portion of drive crank 54 is in an uppermost position. On the other hand, the dashed line illustration in FIG. 2 illustrates the position of the probe 72 when the outermost portion of the drive crank 54 and the arm 44 are in their respective, lowermost positions. An outer, lower edge portion of the probe 72 moves along an arcuate path designated 80 in FIG. 2 as the plunger mechanism 26 moves through its operating cycle.

When the plunger head 27 is in its fully extended, crop compacting position as shown in FIG. 1, the end segments 78 of the probes 72 are approximately midway between the two extreme positions as shown by the full line and dashed line drawings in FIG. 2. Thus, the probes 72 are disposed away from the path of travel of the needles 66 to avoid interference with the latter and enable the strands of binding line to be safely carried upwardly toward the knotting device 58. More important, however, is the fact that the probes 72 prevent substantial accumulation of loose crop materials on the top of frame member 28 so that the tips of the needles 66 do not engage and carry such materials toward the knotting device 58.

We claim:

1. A baler comprising:
chamber defining means defining a baling chamber;
plunger mechanism including a plunger head presenting crop engaging elements, structure defining a clearance opening between an adjacent pair of said elements, and drive means for shifting said plunger head in said baling chamber through a series of operating cycles each comprising a crop compaction stroke followed by a retraction stroke, said drive means including an arm pivotally connected to the plunger head for shifting the plunger head;
apparatus movable through said clearance opening and along a path at least partially within said plunger head during at least a portion of said operating cycle of said plunger head; and
probe means for clearing crop materials from said plunger head in order to remove crop materials from areas adjacent said path of said apparatus,
said probe means being mounted on said arm for shiftable movement relative to said plunger head and relative to said chamber defining means along a path of sweeping motion at least partially within said head and during at least a portion of the operating cycle of said plunger head.

2. A baler comprising:
chamber defining means defining a baling chamber;
plunger mechanism including a plunger head presenting crop engaging elements, structure defining a clearance opening between an adjacent pair of said elements, and drive means for shifting said plunger head in said baling chamber through a series of operating cycles each comprising a crop compaction stroke followed by a retraction stroke, said plunger mechanism including an arm swingable relative to said plunger head during at least a portion of the operating cycle of said plunger head, a source of rotary power, and a drive crank connected to said source of power;
said arm drivingly connecting said drive crank to said plunger head for shifting movement of the plunger head;
apparatus movable through said clearance opening and along a path at least partially within said plunger head during at least a portion of said operating cycle of said plunger head; and
probe means mounted on said plunger mechanism for movement therewith for clearing crop materials from said plunger head in order to remove crop materials from areas adjacent said path of said apparatus,
said probe means being fixed to said arm for movement relative to said plunger head and relative to said chamber defining means along a path of sweeping motion at least partially within said head and during at least a portion of the operating cycle of said plunger head.

3. A baler comprising:
chamber defining means defining a baling chamber;
plunger mechanism including an elongated frame member and a plurality of crop engaging elements connected to said frame member in spaced relation along the length of the latter,
said plunger mechanism including drive means coupled to said frame member for shifting said elements through an operating cycle comprising an alternating series of crop compaction strokes followed by retraction strokes, said drive means including an arm pivotally connected to the frame member for shifting the elements;
at least one needle movable through the space between an adjacent two of said elements for presenting binding line to a device for securing the line around a completed bale; and
at least one probe mounted on said arm,
said at least one probe being movable relative to said chamber defining means and said frame member for movement in said space between the elements in areas adjacent the path of travel of said at least one needle in order to remove crop materials from said space.

4. The invention as set forth in claim 3, wherein said at least one probe is fixedly mounted on the arm for swinging movement relative to the frame member in an arc about a generally horizontal axis.

5. A baler comprising:
chamber defining means defining a baling chamber;
plunger mechanism including an elongated frame member and a plurality of crop engaging elements connected to said frame member in spaced relation along the length of the latter,
said plunger mechanism including drive means coupled to said frame member for shifting said elements through an operating cycle comprising an alternating series of crop compaction strokes followed by retraction strokes,
at least one needle movable through the space between an adjacent two of said elements for presenting binding line to a device for securing the line around a completed bale; and
at least one probe shiftably carried by said plunger mechanism,
said at least one probe being movable relative to said chamber defining means and said frame member for movement in said space between the elements in areas adjacent the path of travel of said at least one needle in order to remove crop materials from said space and away from the path of travel of said at least one needle,
wherein said at least one probe is disposed for movement in areas above said frame member for removal of crop materials resting on said frame member.

6. The invention as set forth in claim 5, wherein said frame member extends in a generally horizontal direction in substantially transverse relationship to the direction of said compaction strokes.

* * * * *